US011053848B2

(12) United States Patent
Kray et al.

(10) Patent No.: US 11,053,848 B2
(45) Date of Patent: Jul. 6, 2021

(54) ADDITIVELY MANUFACTURED BOOSTER SPLITTER WITH INTEGRAL HEATING PASSAGEWAYS

(71) Applicant: General Electric Company, Schenectady, NY (US)

(72) Inventors: Nicholas Joseph Kray, Mason, OH (US); Sreekanth Kumar Dorbala, Bangalore (IN); Nitesh Jain, Bangalore (IN); Prashant Sharma, Bangalore (IN)

(73) Assignee: General Electric Company, Schenectady, NY (US)

(*) Notice: Subject to any disclaimer, the term of this patent is extended or adjusted under 35 U.S.C. 154(b) by 132 days.

(21) Appl. No.: 15/878,759

(22) Filed: Jan. 24, 2018

(65) Prior Publication Data

US 2019/0226402 A1 Jul. 25, 2019

(51) Int. Cl.
*F02C 7/047* (2006.01)
*B64D 33/02* (2006.01)
*F01D 25/02* (2006.01)

(52) U.S. Cl.
CPC .............. *F02C 7/047* (2013.01); *B64D 33/02* (2013.01); *F01D 25/02* (2013.01); *B64D 2033/0233* (2013.01); *F05D 2230/31* (2013.01)

(58) Field of Classification Search
CPC .... F02C 7/04; F02C 7/047; F02C 3/04; F02C 7/052; B64D 33/02; B64D 2033/0233; B64D 2033/024; F01D 25/02; F05D 2230/031; F02K 3/06; F02K 3/075
See application file for complete search history.

(56) References Cited

U.S. PATENT DOCUMENTS

| 2,712,727 | A | * | 7/1955 | Morley | F02C 7/047 60/39.093 |
| 3,933,327 | A | | 1/1976 | Cook et al. | |
| 5,841,079 | A | | 11/1998 | Parente | |
| 6,079,670 | A | | 6/2000 | Porte | |
| 6,427,434 | B2 | | 8/2002 | Porte et al. | |
| 6,442,944 | B1 | * | 9/2002 | Skur, III | B64D 13/00 244/134 R |
| 6,561,760 | B2 | | 5/2003 | Wadia et al. | |

(Continued)

FOREIGN PATENT DOCUMENTS

| CN | 104279010 A | 1/2015 |
| EP | 2129579 B1 | 2/2011 |

OTHER PUBLICATIONS

China National Intellectual Property Administration, "First Office Action," issued in connection with Chinese Patent Application No. 201910067435.0, dated Dec. 2, 2020, 22 pages. English translation included.

*Primary Examiner* — Jason H Duger
(74) *Attorney, Agent, or Firm* — Hanley, Flight & Zimmerman, LLC

(57) ABSTRACT

A booster splitter for a gas turbine engine and a method of additively manufacturing the booster splitter are provided. The booster splitter includes an annular outer wall defining an internal fluid passageway in fluid communication with a fluid supply and terminating in discharge ports that eject a flow of fluid into the compressor section of the gas turbine engine. The internal fluid passageway may also be in fluid communication with heating plenums of a first plurality of airfoils for heating those airfoils.

20 Claims, 5 Drawing Sheets

(56) References Cited

U.S. PATENT DOCUMENTS

| | | | |
|---|---|---|---|
| 7,398,641 B2 | 7/2008 | Stretton et al. | |
| 7,581,378 B2 | 9/2009 | Brand et al. | |
| 7,823,374 B2 | 11/2010 | Venkataramani et al. | |
| 8,210,825 B2 | 7/2012 | Jensen et al. | |
| 8,844,877 B1* | 9/2014 | Driemeyer | B64C 1/38 244/117 A |
| 9,657,640 B2 | 5/2017 | Herbaut et al. | |
| 9,777,632 B2 | 10/2017 | Prather et al. | |
| 2007/0234704 A1 | 10/2007 | Moniz et al. | |
| 2010/0163678 A1* | 7/2010 | Gregory | B64D 15/04 244/134 B |
| 2012/0192544 A1 | 8/2012 | Roby et al. | |
| 2015/0007895 A1* | 1/2015 | Herbaut | F02C 7/047 137/15.1 |
| 2016/0305322 A1 | 10/2016 | Bouillon et al. | |
| 2017/0008635 A1 | 1/2017 | Mackin et al. | |
| 2017/0043877 A1* | 2/2017 | Bouillon | F01D 25/02 |
| 2017/0321604 A1* | 11/2017 | Lourit | F02K 3/06 |

\* cited by examiner

ADDITIVELY MANUFACTURED BOOSTER SPLITTER WITH INTEGRAL HEATING PASSAGEWAYS

FIELD

The present subject matter relates generally to booster splitters for gas turbine engines, and more particularly, to additively manufactured booster splitters including anti-icing features.

BACKGROUND

A core of a gas turbine engine generally includes, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

During operation of the gas turbine engine, various components may experience extreme temperature gradients which may result in operational issues if not controlled. For example, the core engine may include a leading nose that splits the flow of inlet air between a flow that passes through the core engine and a flow that passes through a bypass passageway. This leading nose, frequently referred to as a "booster splitter," may be exposed to very cold air during high altitude or cold environment operation, resulting in ice build-up. Various conventional systems and methods are used for controlling the temperatures of the booster splitter, such as routing heated air to a plenum defined between the inner and outer walls of the booster splitter or using resistance heaters positioned within the booster splitter. However, such methods of controlling the temperature of such components often require complicated plumbing and multi-part assemblies that are both inefficient and increase the likelihood of leaks or other component failures.

Accordingly, a booster splitter including improved anti-icing features would be useful. More specifically, an additively manufactured booster splitter of a gas turbine engine including efficient heating features without costly or complicated fluid supply or heating systems would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine defining an axial direction and a radial direction is provided. The gas turbine engine includes an annular inner wall defining a radially outer boundary of a compressor flow path defined through a compressor section of the gas turbine engine and an annular outer wall spaced apart from the inner wall along the radial direction, the outer wall being curved to meet with the inner wall at a forward end, the forward end defining an inlet to the compressor flow path. A fluid passageway is defined within the outer wall and a fluid supply is in fluid communication with the fluid passageway for providing a flow of fluid through the fluid passageway.

In another exemplary aspect of the present disclosure, a gas turbine engine is provided including a core engine including a compressor section, a combustion section, and a turbine section in serial flow order. An annular nacelle is positioned around the core engine, a bypass airflow passageway being defined between the core engine and the nacelle, the annular nacelle defining an engine inlet for receiving a primary flow of air. A splitter is positioned at a forward end of the core engine and defining a core inlet, the splitter configured for splitting the primary flow of air between the core inlet and the bypass airflow passageway. The splitter includes an annular outer wall defining an internal fluid passageway and a fluid supply in fluid communication with the internal fluid passageway for providing a flow of fluid to the internal fluid passageway. A plurality of discharge ports are defined on the outer wall and being in fluid communication with the internal fluid passageway for discharging the flow of fluid into the core engine.

According to still another embodiment, a method of manufacturing a splitter is provided. The method includes depositing a layer of additive material on a bed of an additive manufacturing machine and selectively directing energy from an energy source onto the layer of additive material to fuse a portion of the additive material and form the splitter. The splitter includes an annular inner wall defining a radially outer boundary of a compressor flow path defined through a compressor section of the gas turbine engine and an annular outer wall spaced apart from the inner wall along the radial direction, the outer wall being curved to meet with the inner wall at a forward end, the forward end defining an inlet to the compressor flow path and an internal fluid passageway.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
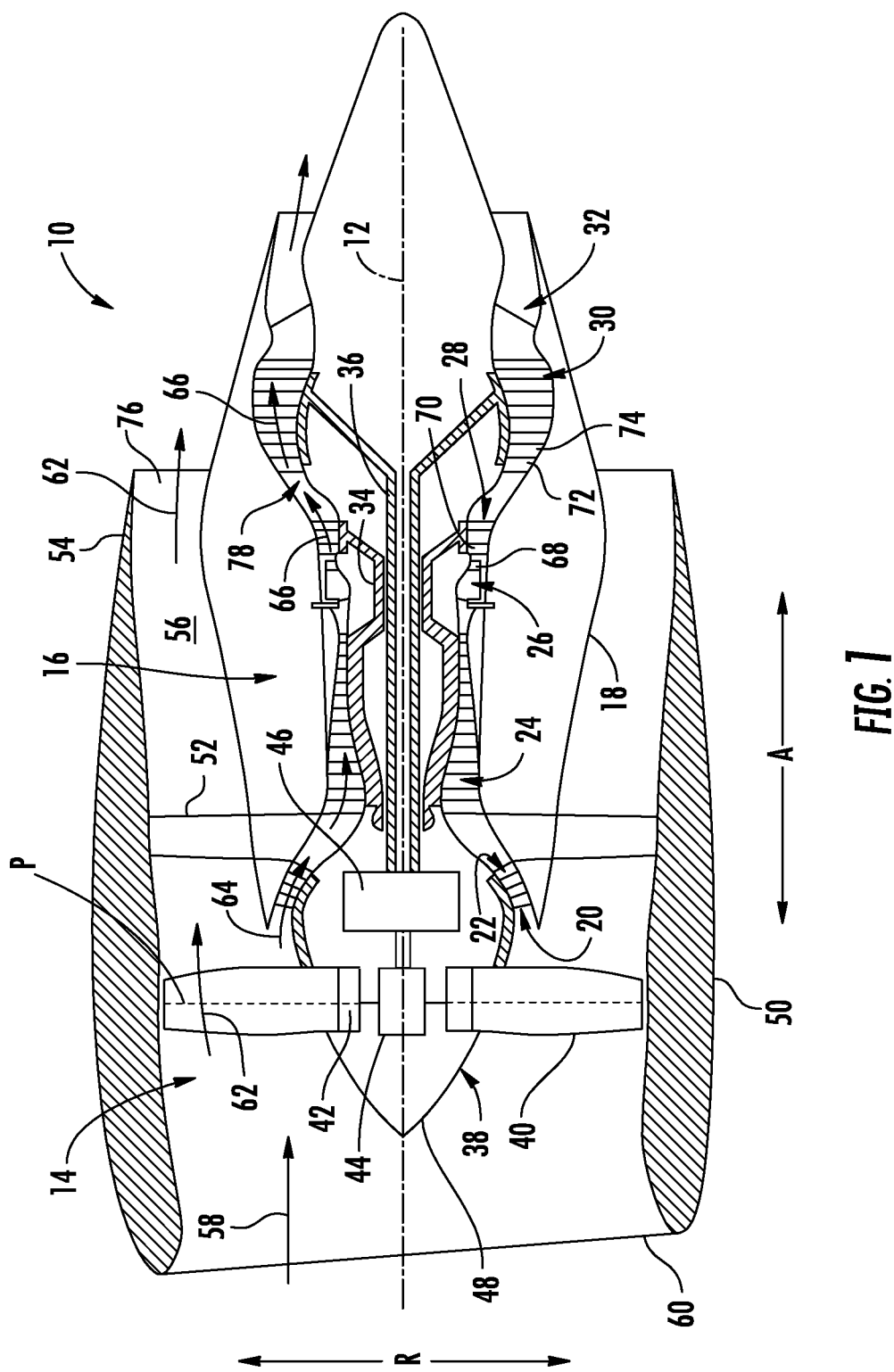
FIG. 1 is a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a thermal management system, with forward referring to a position closer to component inlet and aft referring to a position closer to a component exhaust. The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

The present disclosure is generally directed to a booster splitter for a gas turbine engine and a method of additively manufacturing the booster splitter. The booster splitter includes an annular outer wall defining an internal fluid passageway in fluid communication with a fluid supply and terminating in discharge ports that eject a flow of fluid into the compressor section of the gas turbine engine. The internal fluid passageway may also be in fluid communication with heating plenums of a first plurality of airfoils for heating those airfoils.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only and that in other exemplary embodiments, turbofan 10 may have any other suitable configuration. For example, it should be appreciated that in other exemplary embodiments, turbofan 10 may instead be configured as any other suitable turbine engine, such as a turboprop engine, turbojet engine, internal combustion engine, etc.

Referring still to FIG. 1, turbofan 10 may include a booster splitter or splitter 100 positioned at a forward end or leading edge of core turbine engine 16. Splitter 100 may generally be configured for dividing a primary flow of air (as indicated by inlet air 58 in FIG. 1) that enters engine inlet 60 into a flow of bypass air (as indicated by first portion of air 64 in FIG. 1) and a flow of combustion air (as indicated by second portion of air 62 in FIG. 1). As will be explained in detail below, splitter 100 may include one or more walls that define internal fluid passageways for circulating fluid throughout splitter to prevent ice build-up. Although the description below refers to the construction of splitter 100 for use in turbofan 10, it should be appreciated that splitter 100 is used only for the purpose of explaining aspects of the present subject matter. Indeed, aspects of the present subject matter may be applied to form splitters in alternative configurations and for other gas turbine engines.

In general, the exemplary embodiments of splitter 100 described herein may be manufactured or formed using any suitable process. However, in accordance with several aspects of the present subject matter, splitter 100 may be formed using an additive-manufacturing process, such as a 3-D printing process. The use of such a process may allow splitter 100 to be formed integrally, as a single monolithic component, or as any suitable number of sub-components. In particular, the manufacturing process may allow splitter 100 to be integrally formed and include a variety of features not possible when using prior manufacturing methods. For example, the additive manufacturing methods described herein enable the manufacture of splitters including walls having internal fluid passageways and various features defined within these fluid passageways which were not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer subcomponents and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral inlet and outlet manifolds. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved performance and reliability.

Figure 2:
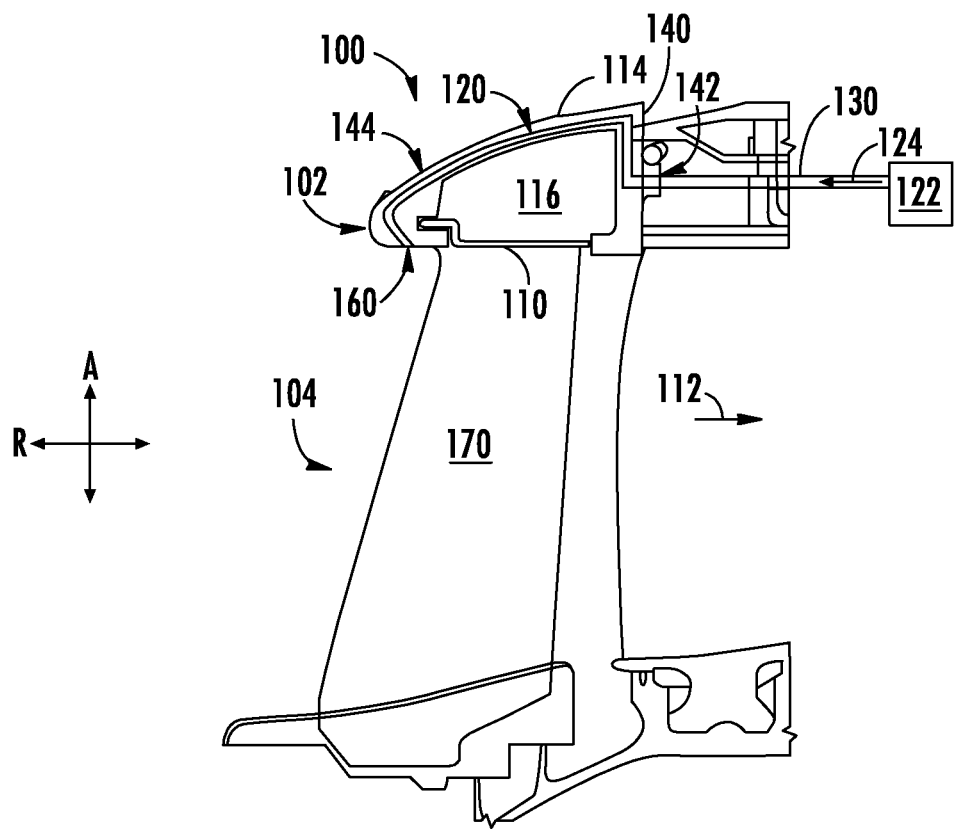
FIG. 2 provides a cross-sectional view of an additively manufactured booster splitter positioned on a forward end of a core engine of the exemplary gas turbine engine of FIG. 1.
Figure 3:
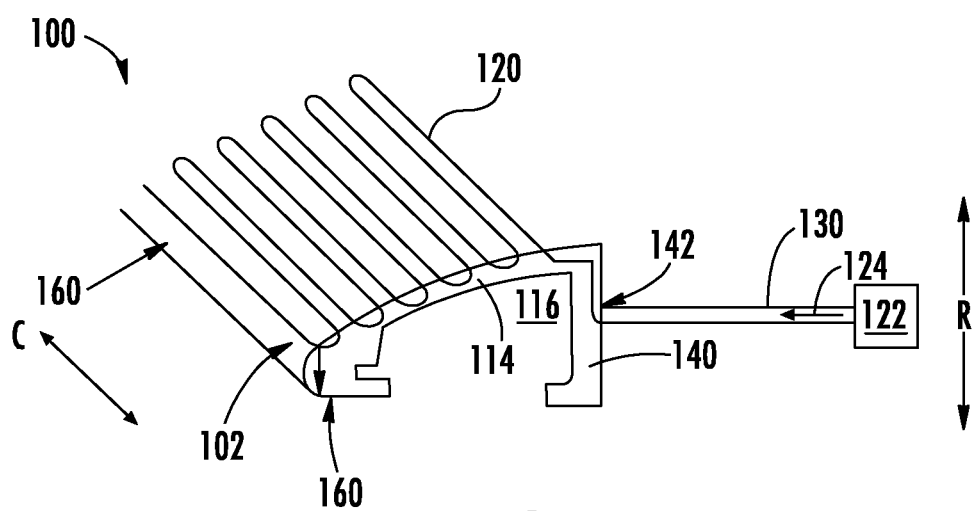
FIG. 3 provides a schematic perspective view of the exemplary booster splitter of FIG. 2 according to an exemplary embodiment of the present subject matter.
Figure 4:
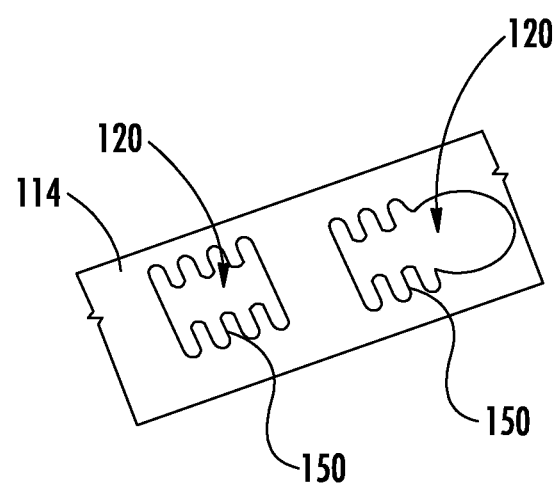
FIG. 4 provides a cross sectional view of an internal fluid passageway defined within an outer wall of the exemplary booster splitter of FIG. 2 according to an exemplary embodiment of the present subject matter.
Figure 5:
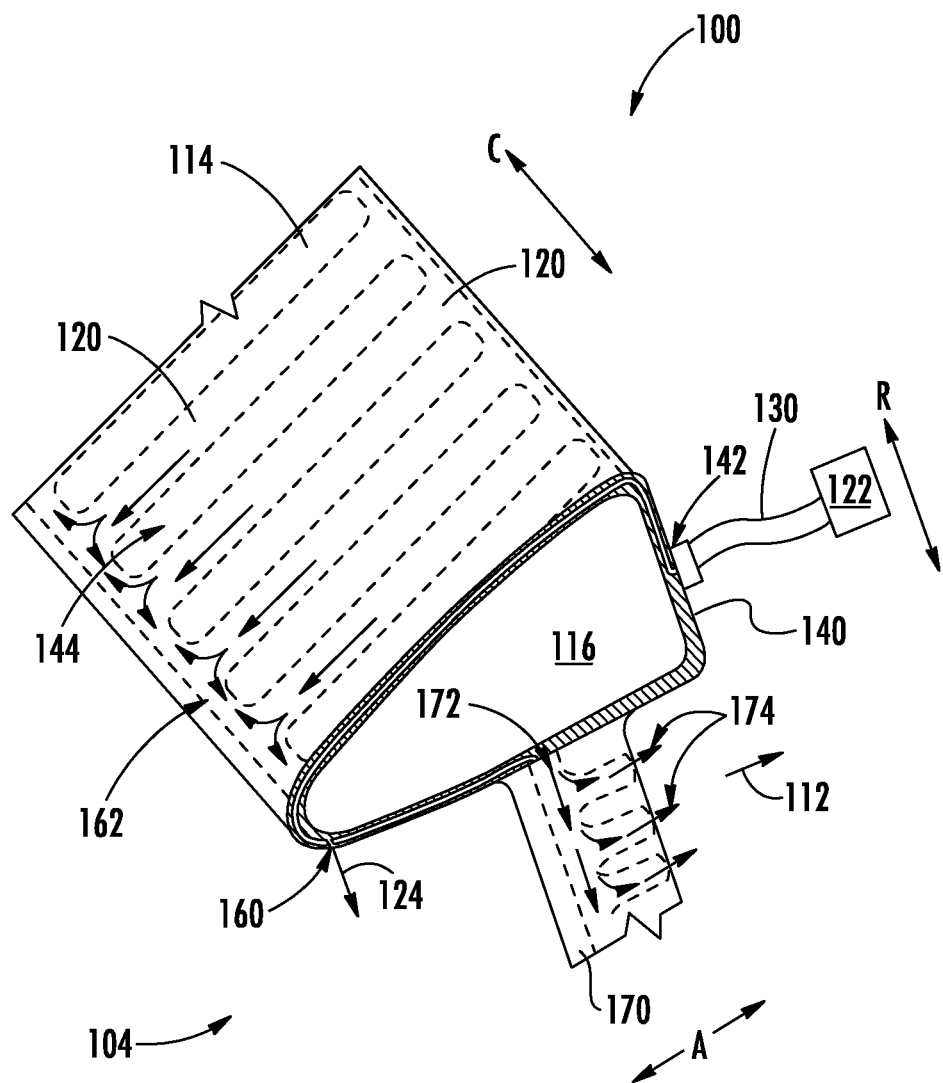
FIG. 5 provides a schematic perspective view of the exemplary booster splitter of FIG. 2 according to another exemplary embodiment of the present subject matter.

Referring now to FIGS. 2 through 5, splitter 100 will be described according to various exemplary embodiments of the present subject matter. In particular, FIG. 2 illustrates a close-up cross-sectional view of splitter 100 mounted to a forward end of core turbine engine 16. In addition, FIGS. 3 through 5 illustrate various schematic cross-sectional views of the internal fluid passageways within splitter 100. Although exemplary constructions of splitter 100 are illustrated herein for the purpose of explaining aspects of the present subject matter, it should be appreciated that these examples are not intended to limit the scope of the present subject matter.

As described above with respect to FIG. 1, turbofan engine 10 generally includes core turbine engine 16 which includes a compressor section (e.g., LP and HP compressors 22, 24), a combustion section 26, and a turbine section (e.g., HP and LP turbine 28, 30) arranged in serial flow order. Similarly, an annular nacelle 50 is positioned around core turbine engine 16 to define a bypass airflow passage 56 therebetween. In addition, nacelle 50 generally defines an engine inlet 60 which receives a primary flow of air (e.g., as indicated by arrows 58) to support engine operation.

Referring now specifically to FIG. 2, splitter 100 positioned at a leading edge or forward end 102 of core engine 16. In this regard, splitter 100 generally defines an inlet to core engine 16 or core inlet 104 at a forward end 102. Splitter 100 is generally configured for splitting the primary flow of air 58 between core inlet 104 and bypass airflow passageway 56. More specifically, referring again to FIG. 1, the primary flow of air 58 is divided by splitter 100 into a flow of bypass air 62 and a flow of core engine or combustion air 64.

As best illustrated in FIG. 2, splitter 100 generally includes annular inner wall 110 which defines the radially outer boundary of a compressor flow path 112 through which the flow of combustion air 64 passes. In addition, splitter 100 includes an annular outer wall 114 that is spaced apart from inner wall 110 along the radial direction R. As illustrated, outer wall 114 defines the radially inner boundary of bypass airflow passageway 56. As illustrated, inner wall 110 and outer wall 114 are positioned at a larger radial spacing downstream of forward end 102 and are generally curved or tapered toward each other to define the leading edge, nose, or forward end 102 of core engine 16. More specifically, as illustrated, outer wall 114 is curved to meet inner wall 110 at forward end 102 and to define core inlet 104. In addition, a splitter plenum 116 is generally defined between inner wall 110 and outer wall 114. According to the illustrated embodiment, splitter 100 is formed from a separate inner wall 110 and outer wall 114. However, it should be appreciated that according to alternative embodiments, splitter 100 may be formed as a single, integral piece, such that inner wall 110 and outer wall 114 are not separate components.

Notably, as described above, splitter 100 is generally exposed to very cold environments, e.g., during high-altitude operation, that may result in the formation of ice on splitter 100. To prevent the build-up of ice, conventional gas turbine engines supplied a flow of heated air to a plenum similar to splitter plenum 116 as illustrated in FIG. 2. Alternatively, conventional gas turbine engines would include resistance heating elements within the plenum defined by the booster splitter. However, filling the entire splitter plenum with hot air wastes heated air and harms engine efficiency. In addition, resistance heating elements may be costly, prone to failure, and difficult to assemble in the engine. Thus, aspects of the present subject matter provided a more effective means for heating and deicing the booster splitter of a gas turbine engine.

Referring still to FIGS. 2 through 5, using the additive manufacturing techniques described herein, outer wall 114 is formed such that one or more internal fluid passageways 120 are defined within the outer wall 114. As described in more detail below, turbofan engine 10 further includes a fluid supply 122 that is in fluid communication with internal fluid passageways 120 for providing a flow of fluid (e.g., as indicated by arrows 124) through internal passageways 120. For example, according to the illustrated embodiment, an inlet conduit 130 extends between and fluidly couples the compressor section (e.g. HP compressor 24) and internal fluid passageways 120. In this manner, hot air may be bled off of HP compressor 24 and routed directly into internal fluid passageways 120.

According to the illustrated embodiment, the heating fluid is compressed air bled off of HP compressor 24, but the present disclosure is not limited to the use of compressed air for heating. Thus, it should be appreciated that "fluid" may be used herein to refer to any gas, liquid, or some combination thereof. For example, other fluids may be used to provide heating, although such fluids might be recirculated or discharged at a location other than the core engine. Thus, the present approach is not limited by the types of fluids that are used, and may be used for any suitable types of liquid and gaseous fluids, such as fuel, hydraulic fluid, combustion gas, refrigerant, refrigerant mixtures, dielectric fluid for cooling avionics or other aircraft electronic systems, water, water-based compounds, water mixed with antifreeze additives (e.g., alcohol or glycol compounds), oil, air, and any other fluid or fluid blends.

Using internal fluid passageways 120 as described herein, outer wall 114 of splitter 100 may be heated directly instead of being warmed by hot air within splitter plenum 116. This direct heating proximate to the exterior surface of outer wall 114 is more effective, easier to implement, and requires less bleed air to be drawn from core engine 16.

As illustrated in FIGS. 2 and 5, splitter 100 further includes an annular bulkhead 140 that extends substantially along the radial direction R between inner wall 110 and outer wall 114. According to the illustrated embodiment, bulkhead 140 defines an inlet port 142 that is fluidly coupled with inlet conduit 130 for receiving the flow heated air 124. In this regard, heated air 124 flows into bulkhead 140, radially outward to outer wall 114, and through outer wall 114 proximate an exterior surface 144 where ice would otherwise build-up. In this regard, internal fluid passageways 120 may be defined within 2 centimeters of exterior surface 144, or even closer, such as within 1 centimeter or 0.5 centimeters of exterior surface 144. Such proximity of the internal fluid passageways 120 to exterior surface 144 results in improved heat transfer and reduced ice build-up.

Notably, outer wall 114 may define additional features for improving the transfer of thermal energy to outer wall 114. For example, as best illustrated in FIG. 3, internal fluid passageway 120 may define a serpentine pattern within outer wall 114. In this regard, internal fluid passageway 120 may zig-zag back and forth along the circumferential direction C as internal fluid passageway 120 is routed toward forward end 102. Alternatively, it should be appreciated that internal fluid passageways 120 could instead be straight, curvilinear, helical, sinusoidal, or any other suitable shape. These various configurations are enabled by the additive manufacturing processes disclosed herein and are considered to be within the scope of the present subject matter.

In addition, referring specifically to FIG. 4, outer wall 114 may define heat exchange fins 150 that extend into internal fluid passageways 120 to improve the heat transfer between the flow of fluid 124 and outer wall 114. Moreover, other suitable heat exchange features may be defined within internal fluid passageway 120, e.g., to maximize the surface area for thermal contact and to improve heat transfer. The size, position, and orientation of heat exchange fins 150 are used herein only to explain aspects of the present subject matter and are not intended to be limiting.

In addition, although a single inlet port 142 is illustrated herein, it should be appreciated that any suitable number of inlet ports 142 and associated internal fluid passageways 120 may be defined within outer wall 114. For example, annular bulkhead 140 may define a plurality of inlet ports 142 spaced circumferentially about bulkhead 140. Each inlet port 142 may be fluidly coupled to HP compressor 24 through a separate inlet conduit 130. According still another exemplary embodiment, a single inlet port 142 may be used to fill an inlet plenum (not illustrated) for distributing the flow of heated air 124 circumferentially around bulkhead 140 and outer wall 114.

In addition, as best illustrated in FIG. 5, outer wall 114 may define multiple internal fluid passageways 120 that are spaced apart along the circumferential direction C, each of which are in fluid communication with fluid supply 122. Similar, to the embodiment illustrated in FIG. 3, each of these multiple fluid passageways 120 may be serpentine or any other suitable shape.

Referring now specifically the FIGS. 2, 3, and 5, splitter 100 may further define a plurality of discharge ports 160 that are generally configured for discharging the flow of fluid 124 out of splitter 100. More specifically, according to the illustrated embodiment, discharge ports 160 are spaced circumferentially around and defined by outer wall 114. Discharge ports 160 are in fluid communication with internal fluid passageways 120 and are oriented for discharging the flow of fluid 124 into core engine 16. In this manner, flow of heated air 14 may also be directed into core inlet 104 for discharging air into the compressor flow path 112 and may be used to heat airfoils within core engine 16 to prevent ice build-up.

As shown in FIG. 5, outer wall 114 may further define an annular discharge plenum 162 which extends circumferentially around forward end 102 of outer wall 114 and is in fluid communication with each of the plurality internal fluid passageways 120. Annular discharge plenum 162 is also in fluid communication with discharge ports 160. In this manner, annular discharge plenum 162 is generally configured for receiving or collecting the flow of fluid 124 from each of the internal fluid passageways 120 and distributing that fluid about the circumferential direction C before discharging the fluid 124 out of discharge ports 160.

Referring now specifically to FIG. 5, core engine 16 of turbofan engine 10 includes a first plurality of airfoils 170, sometimes referred to as inlet guide vanes (IGVs), that are space circumferentially within compressor flow path 112. Notably, airfoils 170 are also prone to ice build-up during cold environment operation. Therefore, according to another exemplary embodiment, each airfoil 170 defines a heating plenum 172 and bleed air ports 174. By providing heating plenum 172 with hot air, ice build-up on airfoils 170 may be reduced or eliminated altogether.

Therefore, according to the illustrated embodiment, internal fluid passageway 120 extends through inner wall 110 and is fluidly coupled to heating plenum 172. In this manner, the flow of heated air 124 may pass into inner wall 110 after heating outer wall 114, and may flow into heating plenum 172 and be directed out bleed air ports 174 back into core engine 16. According to an alternative embodiment, a dedicated internal fluid passageway (not shown) may provide fluid communication between fluid supply 122 and heating plenum 172.

It should be appreciated that splitter 100 is described herein only for the purpose of explaining aspects of the present subject matter. For example, splitter 100 will be used herein to describe exemplary configurations, constructions, and methods of manufacturing splitter 100. It should be appreciated that the additive manufacturing techniques discussed herein may be used to manufacture other booster splitters or core engine inlets for use in any other gas turbine engine. Thus, the exemplary components and methods described herein are used only to illustrate exemplary aspects of the present subject matter and are not intended to limit the scope of the present disclosure in any manner.

Now that the construction and configuration of splitter 100 according to an exemplary embodiment of the present subject matter has been presented, an exemplary method 200 for forming a splitter according to an exemplary embodiment of the present subject matter is provided. Method 200 can be used by a manufacturer to form splitter 100, or any other suitable splitter or core engine inlet. It should be appreciated that the exemplary method 200 is discussed herein only to describe exemplary aspects of the present subject matter, and is not intended to be limiting.

Figure 6:
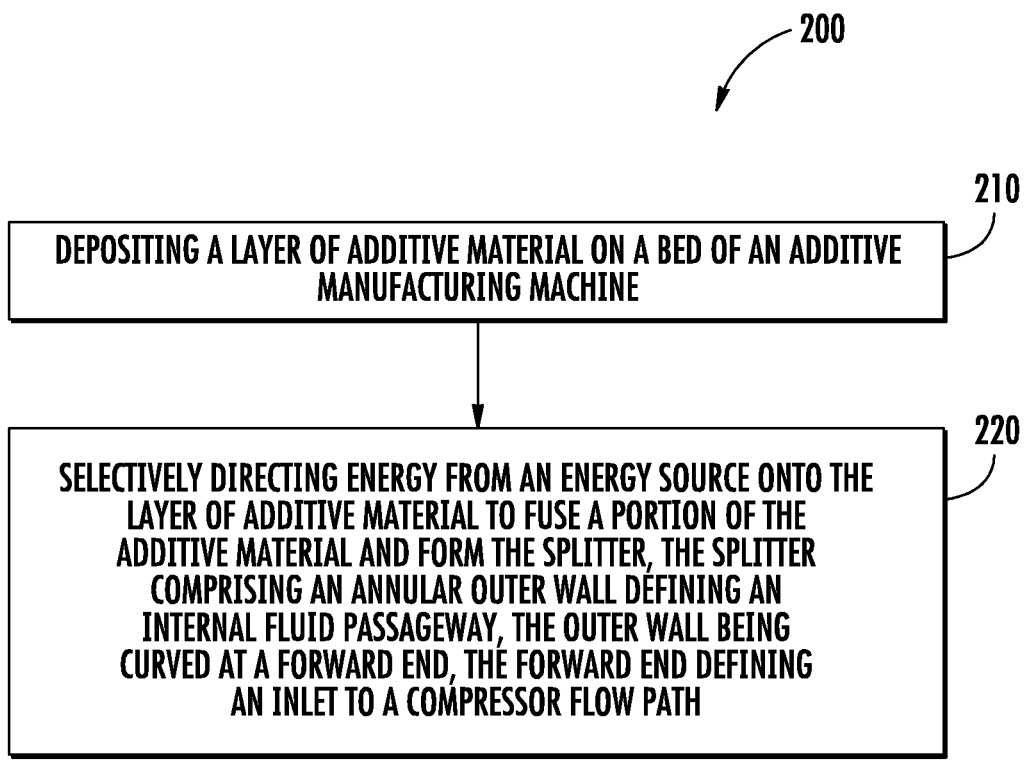
FIG. 6 is a method of manufacturing a booster splitter according to an exemplary embodiment of the present subject matter.

Referring now to FIG. 6, method 200 includes, at step 210, depositing a layer of additive material on a bed of an additive manufacturing machine. Method 200 further includes, at step 220, selectively directing energy from an energy source onto the layer of additive material to fuse a portion of the additive material and form a splitter. For example, using the example from above, splitter 100 may be formed for splitting a flow of primary air between a core engine inlet and a bypass airflow passageway.

The additively manufactured splitter may include an annular inner wall defining a radially outer boundary of a compressor flow path defined through a compressor section of a gas turbine engine. An annular outer wall may be spaced apart from the inner wall along the radial direction, the outer wall being curved to meet with the inner wall at a forward end, the forward end defining an inlet to the compressor flow path. An internal fluid passageway is defined within the outer wall and a fluid supply is in fluid communication with the fluid passageway for providing a flow of fluid through the fluid passageway. Notably, according to an exemplary embodiment, the outer wall, the inner wall, or both may be integrally formed as a single monolithic component.

FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using splitter 100 as an example, it should be appreciated that these methods may be applied to manufacture any suitable splitter or core engine inlet.

A booster splitter and a method for manufacturing that splitter are described above. Notably, splitter 100 may generally include performance-enhancing geometries and internal fluid flow passages whose practical implementations are facilitated by an additive manufacturing process, as described below. For example, using the additive manufacturing methods described herein, the splitter may include an outer wall defining an internal fluid passageway for more efficient and improved heating of booster splitter. In addition, the additive manufacturing techniques described herein enable the formation of an internal fluid passageway that passes a flow of fluid directly onto a first plurality of airfoils (or into a heating plenum within those airfoils). These features may be introduced during the design of the splitter, such that they may be easily integrated into the splitter during the build process at little or no additional cost. Moreover, the entire splitter, including the outer wall, the inner wall, the bulkhead, and all other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction and a radial direction, the gas turbine engine comprising:

an annular inner wall defining a radially outer boundary of a compressor flow path defined through a compressor section of the gas turbine engine;

an annular outer wall spaced apart from the annular inner wall along the radial direction, the annular outer wall being curved to meet with the annular inner wall at a forward end, the forward end defining an inlet to the compressor flow path;

an annular bulkhead spanning between the annular inner wall and the annular outer wall substantially along the radial direction, the bulkhead defining an inlet port;

a fluid passageway defined within the annular outer wall, the fluid passageway extending from the inlet port, into the bulkhead, radially outward to the outer wall, and through the annular outer wall towards the inlet defined by the forward end, the annular outer wall proximate to an exterior surface of the gas turbine engine; and a fluid supply in fluid communication with the fluid passageway for providing a flow of fluid through the fluid passageway.

2. The gas turbine engine of claim 1, wherein the outer wall defines heat exchange fins within the fluid passageway.

3. The gas turbine engine of claim 1, further comprising: an inlet conduit providing fluid communication between the fluid supply and the inlet port.

4. The gas turbine engine of claim 1, wherein the outer wall defines:
an annular discharge plenum extending circumferentially proximate the forward end of the outer wall, the outer wall further defining a plurality of discharge ports spaced circumferentially proximate the forward end and being in fluid communication with the discharge plenum.

5. The gas turbine engine of claim 4, wherein the discharge ports are positioned within the inlet for discharging the flow of fluid into the compressor flow path.

6. The gas turbine engine of claim 1, wherein the gas turbine engine comprises a first plurality of airfoils spaced circumferentially within the compressor flow path, each of the first plurality of airfoils defining a heating plenum and bleed air ports.

7. The gas turbine engine of claim 1, wherein the fluid supply is the compressor section of the gas turbine engine.

8. The gas turbine engine of claim 7, wherein an inlet conduit provides fluid communication between a high pressure compressor and one or more inlet ports defined by the outer wall.

9. The gas turbine engine of claim 1, wherein the fluid passageway defines a serpentine pattern within the outer wall.

10. The gas turbine engine of claim 1, wherein the outer wall defines multiple fluid passageways spaced apart along a circumferential direction of the outer wall, each of the multiple fluid passageways being in fluid communication with the fluid supply.

11. The gas turbine engine of claim 1, wherein the gas turbine engine comprises an annular nacelle spaced apart from the outer wall along the radial direction to define a bypass passageway therebetween, and wherein the inner wall and the outer wall split a primary flow of air into a flow of bypass air and a flow of core air.

12. The gas turbine engine of claim 1, wherein the outer wall, the inner wall, or both are integrally formed as a single monolithic component.

13. The gas turbine engine of claim 1, wherein the inner wall and the outer wall comprise a plurality of layers formed by:
depositing a layer of additive material on a bed of an additive manufacturing machine; and
selectively directing energy from an energy source onto the layer of additive material to fuse a portion of the additive material.

14. The gas turbine engine of claim 1, wherein the passageway is surrounded and confined by the outer wall.

15. The gas turbine engine of claim 1, wherein the annular bulkhead defines a plurality of inlet ports, the inlet ports spaced circumferentially about the bulkhead, each of the inlet ports fluidly coupled to the compressor section through a separate inlet conduit.

16. A gas turbine engine defining an axial direction and a radial direction, the gas turbine engine comprising:
a splitter positioned at a forward end of a core engine and defining a core inlet, the spotter configured for splitting a primary flow of air between the core inlet and bypass airflow passageway, the bypass airflow passageway defined between the core engine and art annular nacelle, the splitter comprising:
an annular inner wall defining a radially outer bounder of a compressor flow path defined through a compressor section of the core engine;
an annular outer wall spaced apart from the annular inner wall along the direction, the annular outer wall being curved to meet with the annular inner wall at a forward end, the forward end defining the core inlet;
an annular bulkhead spanning between the annular inner and the annular outer wall substantially along the radial direction, the bulkhead defining an inlet port;
a fluid passageway defined within the annular outer wall, wherein the fluid passageway extends from the inlet port, into the bulkhead, radially outward to the outer wall, and through the annular outer wall towards the core inlet defined by the forward end, the annular outer wall proximate to an exterior surface of the gas turbine engine; and
a fluid supply in fluid communication with the fluid passageway for providing a flow of fluid to the fluid passageway.

17. The gas turbine engine of claim 16, wherein the outer wall defines heat exchange fins within fluid passageway.

18. The gas turbine engine of claim 14, further comprising: an inlet conduit providing fluid communication between the fluid supply and the inlet port.

19. The gas turbine engine of claim 16, wherein the gas turbine engine comprises a first plurality of airfoils spaced circumferentially within the compressor section, each of the first plurality of airfoils defining a heating plenum and bleed air ports.

20. A method of manufacturing the gas turbine engine according to claim 1, the method comprising:
depositing a layer of additive material on a bed of an additive manufacturing machine; and
selectively directing energy from an energy source onto the layer of additive material to fuse a portion of the additive material and form at least one of: the annular inner wall or the annular outer wall.

* * * * *

UNITED STATES PATENT AND TRADEMARK OFFICE
CERTIFICATE OF CORRECTION

PATENT NO. : 11,053,848 B2
APPLICATION NO. : 15/878759
DATED : July 6, 2021
INVENTOR(S) : Kray et al.

It is certified that error appears in the above-identified patent and that said Letters Patent is hereby corrected as shown below:

In the Claims

In Column 14, Claim 16, Line 20, delete "spotter" and insert -- splitter --,

In Column 14, Claim 16, Line 21, delete "bypass" and insert -- a bypass --,

In Column 14, Claim 16, Line 23, delete "art" and insert -- an --.

Signed and Sealed this
Twenty-second Day of November, 2022

Katherine Kelly Vidal
*Director of the United States Patent and Trademark Office*